V. M. MADSEN.
APPARATUS FOR SALE OF TICKETS AND THE LIKE.
APPLICATION FILED FEB. 21, 1911.
1,003,116.
Patented Sept. 12, 1911.
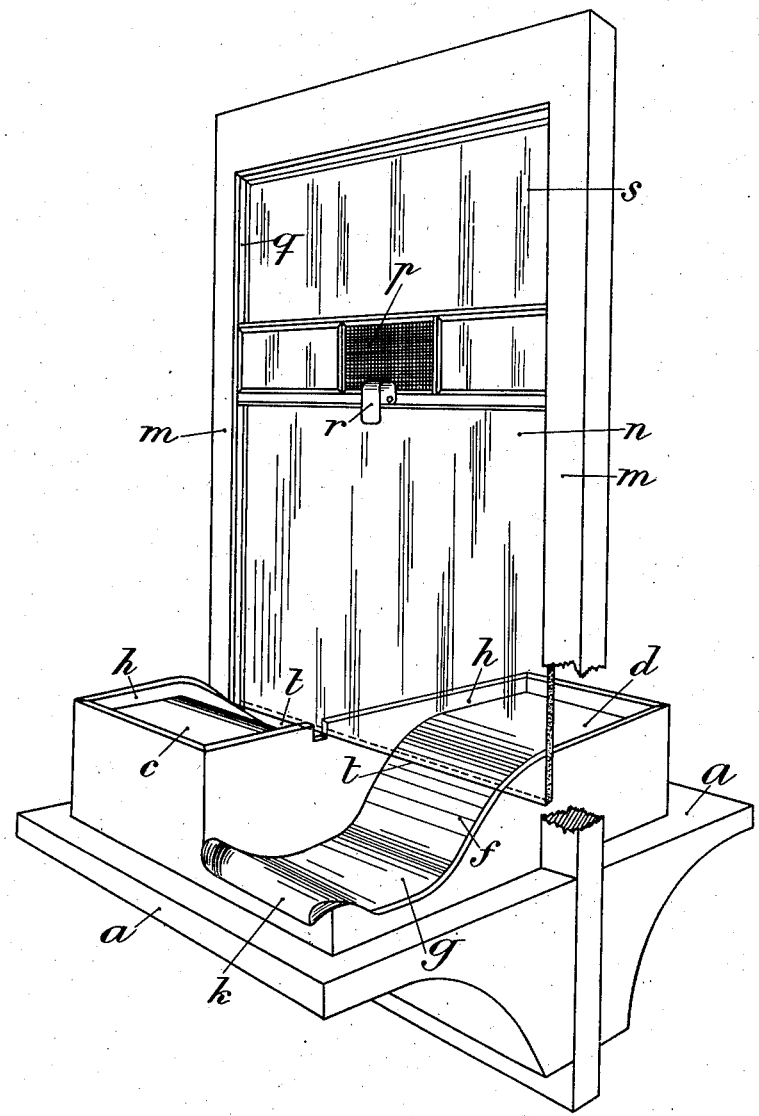

UNITED STATES PATENT OFFICE.

VIGGO MARIUS MADSEN, OF ODENSE, DENMARK.

APPARATUS FOR SALE OF TICKETS AND THE LIKE.

1,003,116.  Specification of Letters Patent. Patented Sept. 12, 1911.

Application filed February 21, 1911. Serial No. 610,072.

*To all whom it may concern:*

Be it known that I, VIGGO MARIUS MADSEN, of No. 1 Adamsgade, Odense, in the Kingdom of Denmark, railway assistant, have invented certain new and useful Improvements in Apparatus for the Sale of Tickets and the Like, of which the following is a specification, reference being had therein to the accompanying drawings.

My invention relates to an apparatus for use in the sale of tickets and other articles.

The apparatus consists of two chutes, each having an inclined portion, which inclined portions extend in opposite directions, so that the article to be sold and the money to be passed between the buyer and the seller can be easily exchanged between them. Across said chutes there is provided a partition, preferably made of glass or some other transparent material and extending midway across the chutes in such a way that between the bottom edge of the partition and the inclined faces of the chutes a passage is left free of sufficient depth to permit the passing of articles and money. The partition, being of glass or transparent material, permits the buyer and seller not only to see each other, but also to overlook the chutes in their entire length.

In the accompanying drawing, an embodiment of my new invention is shown, the apparatus being illustrated in perspective.

$a$ is a table, which may be located in a recess of a wall in such a way that one end of the table extends into the room where the seller is and the other in the room where the buyer is. On the table there are mounted two adjacent chutes, each having an elevated portion $b$ and $c$ respectively and a depressed portion $g$, which portions are connected by an inclined smooth plane $f$, the said inclined planes extending in opposite directions. The chutes may be surrounded by upright edges $h$ and are provided at the lower terminations of the depressed portions with curves $k$.

In a frame $m$ arranged in the wall there is mounted a plate $n$ of some transparent material, preferably glass, which plate extends across the two adjacent chutes midway thereof and separates the buyer from the seller. The plate being of transparent material, they can see each other and can also overlook both chutes in their entire extent. The plate $n$ is so located with respect to the chutes that between its lower edge and the inclined faces $f$ of the chutes there remains a passage of sufficient depth to permit the articles and money to be passed between the buyer and the seller.

The buyer, who may be supposed to stand on the righthand side of the apparatus shown in the drawing, places his money on the elevated portion $d$ of the one chute, and the seller, who may be supposed to stand on the left-hand side of the apparatus, shown in the drawing, places the articles and possible change on the elevated portion $c$ of the other chute. The articles and money will glide down the inclined faces $f$ of each chute to the lower portion $g$ thereof, so that they will come within reach of the buyer and seller respectively.

As shown in the drawing, a wire screen $p$ may be arranged in the plate $n$ in order to permit conversation between the buyer and seller. The plate $n$ may be made in two pieces, in which case the upper piece $s$ is in fixed position, whereas the lower part is slidably arranged in guiding grooves $q$ cut into the frame $m$, so that by means of the handle $r$ the lower part of the glass plate can be raised.

By means of the apparatus, as described, the exchange of articles and money can take place very quickly and under the full supervision of both parties. Moreover, if the apparatus is to be used for selling tickets at a railway station, the ticket agent is protected from draft, tobacco smoke, etc.

I claim:

1. Apparatus for use in selling tickets and other articles comprising two chutes, extending in opposite directions and a partition arranged transverse of said chutes about midway thereof and having its lower edge separated from the chutes to permit the passing of money and articles from one side of the partition to the other.

2. Apparatus for use in selling tickets and other articles, comprising two chutes extending in opposite directions and a transparent partition arranged transverse of said chutes about midway thereof and having its lower edge separated from the chutes to permit the passing of money and articles from one side of the partition to the other.

3. Apparatus for use in selling tickets and other articles, comprising two adjacent chutes, each having an elevated and a depressed portion and an inclined plane connecting the two portions and extending in opposite directions, and a transparent partition arranged transverse of said chutes about midway thereof and having its lower edge separated from the said inclined portion to permit the passing of money and articles from one side of said partition to the other.

4. Apparatus for use in selling tickets and other articles, comprising two adjacent chutes, each having an elevated and a depressed portion and an inclined plane connecting the two portions and extending in opposite directions, and a transparent partition arranged transverse of said chutes about midway thereof and having its lower edge separated from the said inclined portion to permit the passing of money and articles from one side of said partition to the other, and covered means, such as a screen, in said partition to permit conversation between the parties on both sides of the partition.

5. An apparatus for use in selling tickets and other articles, comprising a plurality of chutes extending in opposite directions, a partition, preferably of transparent material arranged transverse of said chutes about midway thereof and having its lower edge separated from the inclined portions of said chutes, sufficiently to permit the passing of money and articles from one side of said partition to the other.

In testimony that I claim the foregoing as my invention, I have signed my name in presence of two subscribing witnesses.

VIGGO MARIUS MADSEN.

Witnesses:
P. HOFMAN-BANG,
ERNEST BOUTORD.